(12) United States Patent
Shimanouchi et al.

(10) Patent No.: US 7,446,994 B2
(45) Date of Patent: Nov. 4, 2008

(54) VARIABLE CAPACITOR AND MANUFACTURING METHOD THEREOF

(75) Inventors: Takeaki Shimanouchi, Kawasaki (JP); Masahiko Imai, Kawasaki (JP); Tadashi Nakatani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 106 days.

(21) Appl. No.: 11/504,677

(22) Filed: Aug. 16, 2006

(65) Prior Publication Data

US 2007/0025050 A1 Feb. 1, 2007

Related U.S. Application Data

(63) Continuation of application No. PCT/JP2004/007493, filed on May 31, 2004.

(51) Int. Cl.
*H01G 5/01* (2006.01)

(52) U.S. Cl. ............ 361/278; 361/272; 361/283.1; 361/290; 361/292

(58) Field of Classification Search ......... 361/272–273, 361/277, 278, 279, 281, 283.1, 290–292, 361/283.2
See application file for complete search history.

(56) References Cited

U.S. PATENT DOCUMENTS

| | | | |
|---|---|---|---|
| 4,675,960 A | | 6/1987 | Higgins, Jr. |
| 4,716,331 A | | 12/1987 | Higgins, Jr. |
| 5,982,608 A | * | 11/1999 | Kalnitsky et al. ............ 361/288 |
| 6,377,438 B1 | * | 4/2002 | Deane et al. ................. 361/278 |
| 6,606,235 B2 | * | 8/2003 | Chua et al. ................... 361/278 |
| 6,649,852 B2 | * | 11/2003 | Chason et al. ............... 200/181 |
| 6,885,537 B2 | * | 4/2005 | Nakayama ................... 361/277 |
| 6,897,537 B2 | * | 5/2005 | de los Santos .............. 257/414 |
| 6,909,589 B2 | * | 6/2005 | Huff ............................ 361/281 |

FOREIGN PATENT DOCUMENTS

| | | |
|---|---|---|
| JP | 63-501993 | 8/1988 |
| JP | 07-335491 | 12/1995 |
| JP | 10-149951 | 6/1998 |
| JP | 10-189393 | 7/1998 |
| JP | 2004-006588 A | 1/2004 |
| JP | 2004-127973 A | 4/2004 |
| WO | 87/04301 A1 | 7/1987 |

OTHER PUBLICATIONS

Jae Y. Park et al, "*Micromachined RF MEMS Tunable Capacitors Using Piezoelectric Actuators*", IEEE International Microwave Symposium, 2001.

* cited by examiner

*Primary Examiner*—Nguyen T Ha
(74) *Attorney, Agent, or Firm*—Arent Fox LLP

(57) ABSTRACT

A lower movable electrode 35, having line sections 35a, 35a on both ends and a capacitor section 35b in the center, and an upper movable electrode 37, having line sections 37a, 37a on both ends and a capacitor section 37b in the center, are placed so that the capacitor sections 35b, 37b face each other, and drive electrodes of lower-movable-electrode actuators 27a, 27b, 27c, 27d driving the lower movable electrode 35 and upper-movable-electrode actuators 29a, 29b, 29c, 29d driving the upper movable electrode 37 are electrically separated from the lower movable electrode 35 and upper movable electrode 37. These actuators 27a to 27d and/or 29a to 29d move the lower movable electrode 35 and/or upper movable electrode 37 to adjust the distance between both capacitor sections 35b, 37b, and control the electrostatic capacity.

12 Claims, 19 Drawing Sheets

FIG. 1
PRIOR ART
(a)
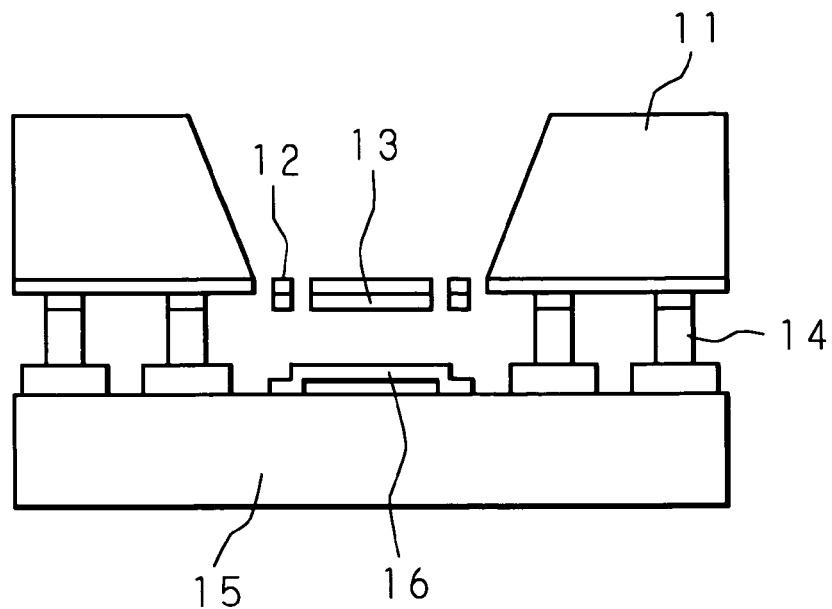
(b)
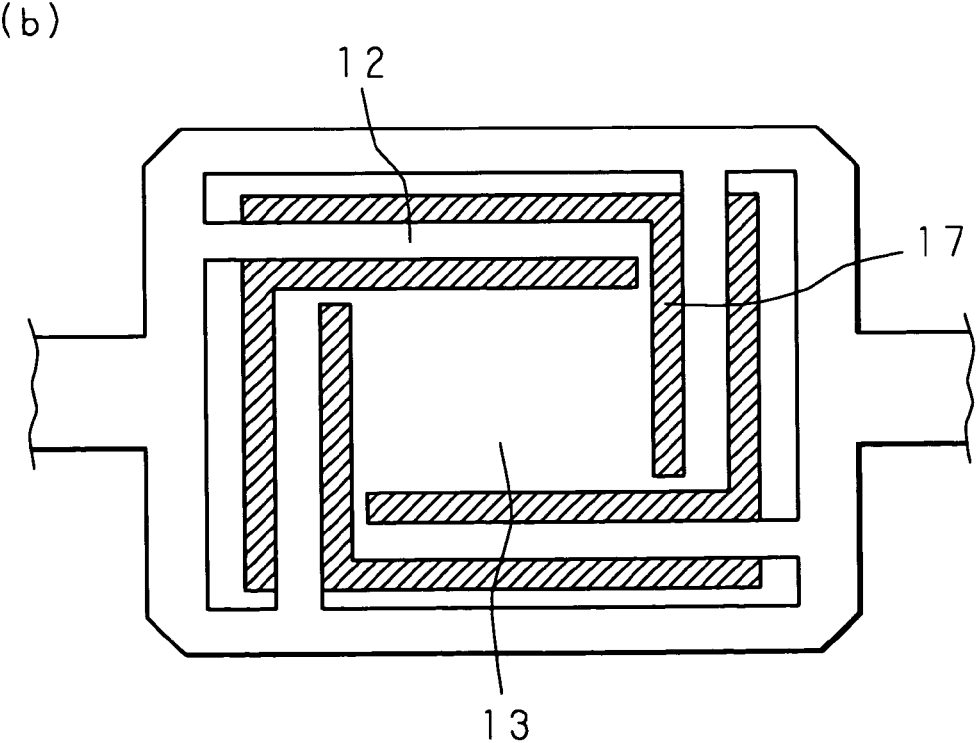

F I G. 5
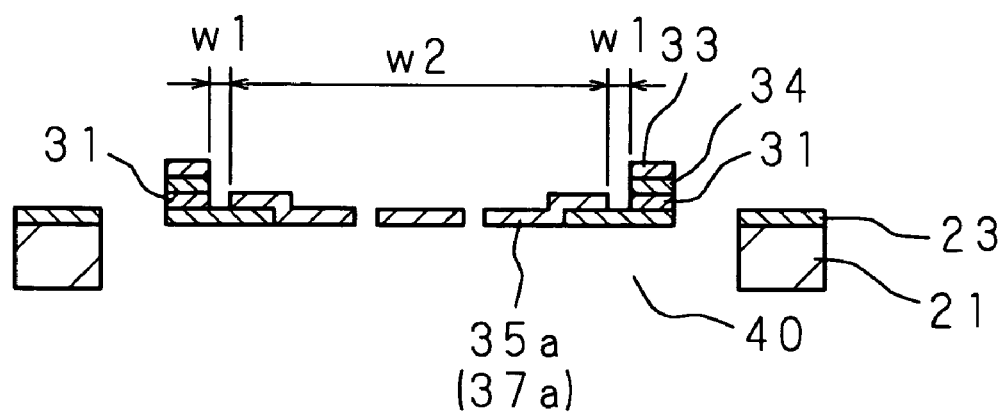

FIG. 16
(a)
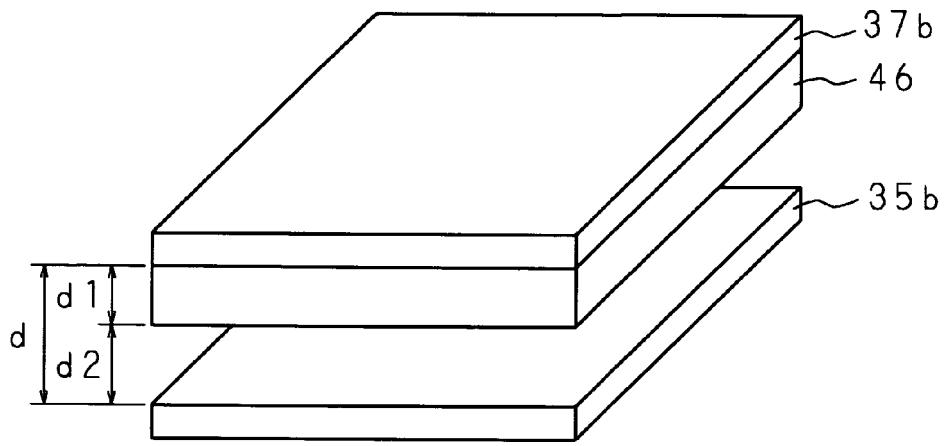
$d = d1 + d2$
(b)
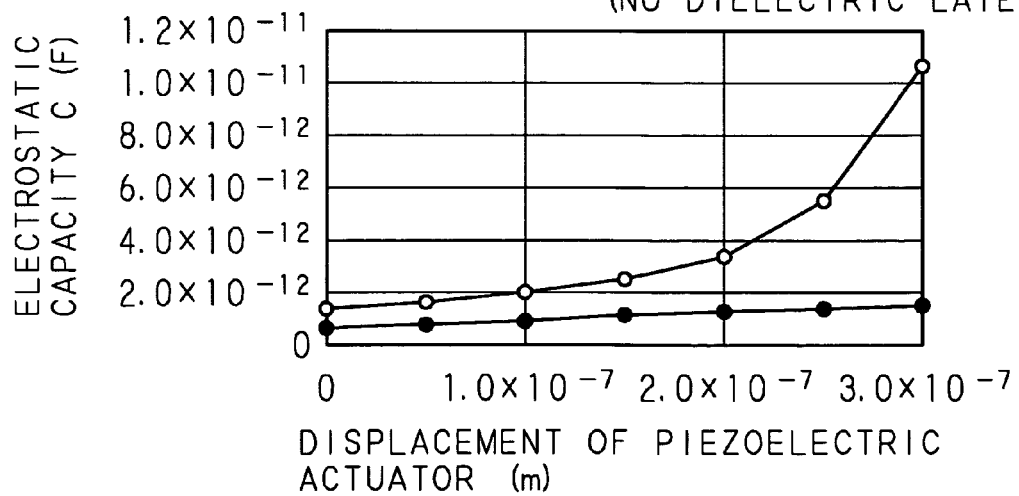

FIG. 17
(a)
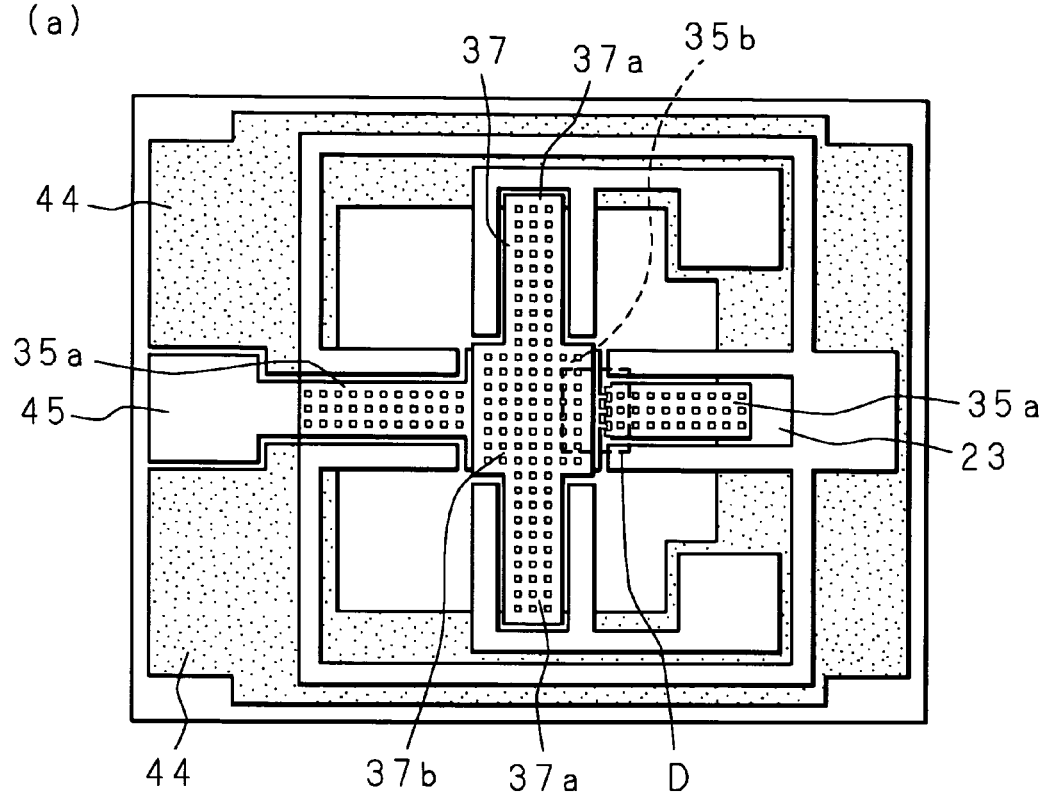
(b)
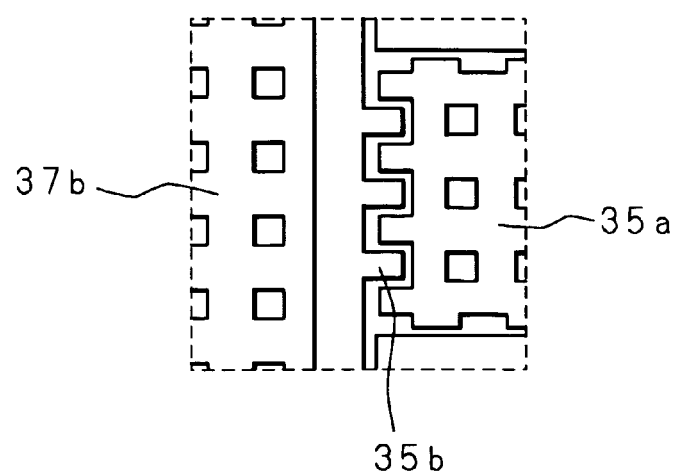

US 7,446,994 B2

VARIABLE CAPACITOR AND MANUFACTURING METHOD THEREOF

This application is a Continuation Application of international Application no. PCT/JP2004/007493, filed May 31, 2004, the entire specification claims and drawings of which are incorporated herewith by reference.

TECHNICAL FIELD

This invention relates to a variable capacitor and manufacturing method thereof, and more particularly to a variable capacitor, which uses MEMS (Micro Electro Mechanical System) technology and has opposing movable electrodes, and manufacturing method thereof.

BACKGROUND ART

A variable capacitor is an important part in electrical circuits such as a variable frequency oscillator, tuned amplifier, phase shifter, impedance-matching circuit and the like, and in recent years, use in portable devices has been increasing. In comparison with varactor diodes that are mainly used now, variable capacitors that are manufactured using MEMS technology have the advantage of less loss and higher Q value, therefore development is rapidly advancing.

FIG. 1(a) is a cross-sectional view and FIG. 1(b) is a top view showing the construction of a conventional variable capacitor (for example, refer to non-patent document 1). This variable capacitor is constructed so that a movable electrode substrate 11, having a unimorph-type piezoelectric actuator 12 and movable electrode 13, and a stationary electrode substrate 15, on which a stationary electrode 16 is mounted, are joined using solder bumps 14, so that the movable electrode 13 and stationary electrode 16 face each other. The piezoelectric actuator 12 drives and moves the movable electrode 13, and the capacity of the capacitor is controlled by varying the distance between the movable electrode 13 and stationary electrode 16.

[Non-patent Document 1]
Jan Y. Park, et al., "MICROMACHINED RF MEMS TUNABLE CAPACITORS USING PIEZOELECTRIC ACTUATORS", IEEE International Microwave Symposium, 2001

DISCLOSURE OF THE INVENTION

However, the conventional variable capacitor described above has problems as described below. The movable electrode 13 and stationary electrode 16 are joined using solder bumps 14, so the distance between the electrodes is controlled by the solder bumps 14, and it is not possible to decrease that distance to a state near '0', as well as it is not possible for the electrostatic capacity of the capacitor to become large when the piezoelectric actuator 12 is in its initial state.

The electrostatic capacity C of the capacitor and the distance d between the electrodes of the capacitor have the relationship $C=\epsilon_o\epsilon_r \cdot S/d$ ($\epsilon_o$: permittivity in a vacuum, $\epsilon_r$: relative permittivity, S=surface area of the electrodes), and this relationship between the electrostatic capacity C and the distance between electrodes d is shown in FIG. 2. In FIG. 2, the scale of the vertical axis and horizontal axis is standardized by the initial C and d. When the amount of change of the piezoelectric actuator is fixed, the percentage of change in electrostatic capacity becomes larger when the electrodes are near each other than when they are separated from each other. Therefore, the fact that it is not possible for the electrostatic capacity in the initial state to become large (it remains small) also means that it is not possible for the change in electrostatic capacity to become large (it remains small).

As shown in FIG. 1(b), in this conventional variable capacitor, the movable electrode 13 and piezoelectric actuator 12 are connected by a torsion bar 17, and the movable electrode 13 and the drive electrode for the piezoelectric actuator 12 are integrated together and electrically connected. The narrow torsion bar 17 is included in the line to the movable electrode 13 of the capacitor, so there is a problem in that this portion forms equivalent series resistance (ESR) and resistance loss occurs; also, the signal line that is electrically connected to the variable capacitor also functions as the drive electrode for the piezoelectric actuator 12, so when this signal line comes in contact with the dielectric piezoelectric element, there is a problem in that dielectric loss occurs, and the Q value becomes very small. Moreover, in the line to the moveable electrode 13, impedance matching is not performed so input energy is lost, or in other words insertion loss also occurs. Therefore, the inventors have been advancing technological development for solving these problems.

The inventors have proposed a variable capacitor that is constructed with two opposing electrodes that are both driven by a piezoelectric actuator (Japanese patent application Laid-Open No.2004-127973). In this kind of variable capacitor having two movable electrodes, there is no solder bumps, so it is possible to easily decrease the distance between both of these electrodes, and even though the capacitor may be small, it is possible to obtain large electrostatic capacity, and it is possible for the electrostatic capacity to change a large amount.

Taking the aforementioned problems into consideration, the object of the present invention is to provide a variable capacitor and manufacturing method thereof that is capable of increasing the electrostatic capacity of the capacitor as well as increase the percentage of change in electrostatic capacity even though the capacitor is small, and that is also capable of performing fine adjustment of the electrostatic capacity and has a high Q value.

Another object of the present invention is to provide a variable capacitor and manufacturing method thereof that is capable of preventing energy loss (insertion loss) in externally input signals.

Yet another object of the present invention is to provide a variable capacitor and manufacturing method thereof that is capable of obtaining large electrostatic capacity and large change in electrostatic capacity even when the driving voltage of the piezoelectric actuator is small.

The variable capacitor of the present invention comprises: a substrate, movable electrodes having first electrode sections and second electrode sections, and a plurality of piezoelectric actuators that drive the movable electrodes; wherein the movable electrodes face each other to form a capacitor, and the movable electrode is conductively connected to a signal pad.

In this invention, the movable electrodes and the piezoelectric actuators that drive the movable electrodes are located on the same substrate, so construction is compact. Also, each of the movable electrodes can move, so it is possible to make the distance between both movable electrodes small, as well as it possible to obtain large electrostatic capacity and large change in electrostatic capacity, and to easily adjust the electrostatic capacity. Moreover, since the first electrode sections, which correspond to the lines (signal lines) that run to the second electrode sections that form the capacitor, and the drive electrodes for driving the piezoelectric actuators are electrically separated, the first electrode sections do not come in contact with the piezoelectric elements (high dielectric body) of the piezoelectric actuators, so it is possible to suppress insertion loss and increase the Q value.

In the variable capacitor of the present invention, the movable electrodes have the first electrode sections and second electrode sections, and the movable electrodes are arranged so that one is an upper movable electrode and the other is a lower movable electrode.

In this invention, a narrow torsion bar is not included in the first electrode sections that correspond to the lines to the second electrode sections that form the capacitor as in the case of the prior art, and since the equivalent series resistance can be made small, it is possible to increase the Q value.

In the variable capacitor of the present invention, each of the plurality of piezoelectric actuators includes drive electrodes and a piezoelectric element that is located between the drive electrodes, and the drive electrodes are separate from the movable electrodes.

In this invention, the movable electrodes for the capacitor and the drive electrodes for the piezoelectric actuators are constructed so that they are separate, so the line sections to do not come in contact with the piezoelectric elements (high dielectric bodies) as in the prior art, and it is possible to increase the Q value.

In the variable capacitor of the present invention the piezoelectric actuators are located on both sides of the first electrode sections of the movable electrodes, and CPW type lines are formed by the first electrode sections and drive electrodes of the piezoelectric actuators.

In this invention, it is possible to easily match impedance by adjusting the width of the first electrode sections of the CPW type lines and the space between the first electrode sections and the drive electrodes of the piezoelectric actuators, so insertion loss is eliminated, and it is possible to increase the Q value.

In the variable capacitor of the present invention, a dielectric layer is located between the second electrode sections of the movable electrodes that face each other.

In this invention, a dielectric layer is located between the second electrode sections that form the capacitor, so it is possible to increase the electrostatic capacity as well as increase the amount of change of the electrostatic capacity.

In the variable capacitor of the present invention, at least one of the movable electrodes is connected to a ground electrode.

In this invention, by connecting one of the movable electrodes to a ground electrode, it is possible to suppress floating capacity.

In the variable capacitor of the present invention, the first electrode section and the section electrode section of at least one of the movable electrodes are electrically separated.

In this invention, the first electrode section and second electrode section of one of the movable electrodes are electrically separated, so signals that are inputted to one of the first electrode sections do not pass by the second electrode section to the other first electrode section and reflected, so energy loss of the input signal (insertion loss) is decreased.

The variable capacitor of the present invention is a variable capacitor having movable electrodes that can be moved in the direction toward each other, and a plurality of piezoelectric actuators that drive the movable electrodes, and comprises: voltage application means for applying voltage between the movable electrodes that is constructed such that when the movable electrodes have been driven close to each other by the piezoelectric actuators, the voltage application means applies voltage between the movable electrodes.

In this invention, by applying voltage between the pair of movable electrodes when the pair of movable electrodes has been driven close to each other by the piezoelectric actuators, the distance between both of the movable electrodes is made even smaller by the electrostatic attraction that is generated between the pair of movable electrodes.

The method for manufacturing a variable capacitor of the present invention is a method for manufacturing a variable capacitor having movable electrodes that are driven by piezoelectric actuators, and comprises: a process of forming a plurality of piezoelectric actuators on a substrate; a process of forming movable electrodes having first electrode sections and second electrode sections on the substrate; a process of forming a sacrificial layer for forming a space between the movable electrodes; a removal process of removing the sacrificial layer; and a separation process of cutting and separating the sections except the end sections of the plurality of piezoelectric actuators and end sections of the first electrode sections of the movable electrodes, from the substrate.

In this invention, a pair of movable electrodes and the piezoelectric actuators that drive them are easily formed on the same substrate.

The method for manufacturing a variable capacitor of the present invention is a method for manufacturing a variable capacitor having movable electrodes that are driven by piezoelectric actuators, and comprises: a process of forming a plurality of piezoelectric actuators on a substrate; a process of forming movable electrodes having first electrode sections and second electrode sections on the substrate; a process of forming a dielectric layer between the movable electrodes; a process of forming a sacrificial layer for forming a space between at least one of the movable electrodes and the dielectric layer; a removal process of removing the sacrificial layer; and a separation process of cutting and separating the sections except the end sections of the plurality of piezoelectric actuators and end sections of the first electrode sections of the movable electrodes from the substrate.

In this invention, the pair of movable electrodes, the piezoelectric actuators that drive them, and the dielectric layer between the pair of movable electrodes are easily formed on the same substrate.

In the method for manufacturing a variable capacitor of the present invention, the removal process and the separation process are performed simultaneously.

In this invention, by performing the removal process of removing the sacrificial layer, and the separation process of cutting and separating the movable electrodes and piezoelectric actuators (except for the end sections) from the substrate simultaneously, it is possible to improve work efficiency.

This invention can provide a variable capacitor having excellent resistance to impact and for which it is possible to increase the electrostatic capacity as well as increase the percentage of change in electrostatic capacity even though construction is compact, and for which it is possible to perform fine adjustment of the electrostatic capacity. Also, the movable electrodes and piezoelectric actuators are electrically separated, torsion bar construction, which is the cause of equivalent series resistance, is eliminated, and wide line sections (first electrode sections) that run to the capacitor formation section (second electrode sections) are maintained, so it is possible to obtain a high Q value.

Moreover, in this invention, the capacitor formation section and surrounding sections are floated in air from the substrate, so an influence of permittivity of the substrate and the like is eliminated, making it possible to obtain a high Q value.

Also, in this invention, the first electrode section and second electrode section of one of the movable electrodes are electrically separated in the boundary section, so it is possible to prevent energy loss (insertion loss) of externally input signals.

Furthermore, in this invention, voltage is applied between the pair of movable electrodes after the pair of movable electrodes have been driven close together by the piezoelectric actuators, so it is possible to further reduce the distance between both movable electrodes by the electrostatic attraction that is generated between the pair of movable electrodes, and thus it is possible to obtain a large electrostatic capacity and large change in electrostatic capacity. Also, since electrostatic attraction is generated when the pair of movable electrodes has been driven close together by the piezoelectric actuators, it is possible to generate large electrostatic attraction with a small drive voltage.

BEST MODE FOR IMPLEMENTING THE INVENTION

The preferred embodiments of the present invention will be explained in detail with reference to the drawings. The invention is not limited to the embodiments described below.

First Embodiment

FIG. 3 is a pictorial view of the variable capacitor of a first embodiment of the present invention, and FIG. 4 is an exploded pictorial view of the same. In the figure, 21 is a substrate that is formed using a compound semiconductor. A cross-shaped opening 40 is formed in the center section of that substrate 21, and an insulating layer 23 is formed on the top surface of the substrate 21.

In the figure, 35 is a lower movable electrode and 37 is an upper movable electrode, where both are made of aluminum (Al). The lower movable electrode 35 comprises line sections 35a, 35a on both ends to form a first electrode section, and a central capacitor section 35b to form a second electrode section, where the end section of one of the line sections 35a is connected to a signal pad 45 to which a signal is inputted from an external high-frequency-signal source (not shown in the figure), and the end section of the other line section 35a is connected to the insulating layer 23 and is electrically separated from a ground electrode 44. These end sections support the lower movable electrode 35 on the substrate 21, and the section of the lower movable electrode 35 other than these end sections is located over the opening 40. Moreover, the upper movable electrode 37 comprises line sections 37a, 37a on both ends to form a first electrode section, and a central capacitor section 37b to form a second electrode section, where the end sections of both line sections 37a, 37a are connected to the ground electrode 44. These end sections support the upper movable electrode 37 on the substrate 21, and the section of the upper movable electrode 37 other than these end sections is located over the opening 40.

The lower movable electrode 35 and upper movable electrode 37 are arranged in a cross shape that corresponds with the opening 40 of the substrate 21 so that the capacitor section 35b of the lower movable electrode 35 and the capacitor section 37 of the upper movable electrode 37 face each other through an air layer. The capacitor section 35b and capacitor section 37b that face each other function as a capacitor. The capacitor section 35b and capacitor section 37b, which are electrically separated from each other, can both be used in a floating state from ground, however, in order to suppress floating capacity, the upper movable electrode 37 is connected to the ground electrode 44.

The lower movable electrode 35 and upper movable electrode 37 are driven by four lower-movable-electrode actuators 27a, 27b, 27c, 27d and four upper-movable-electrode actuators 29a, 29b, 29c 29d, respectively. These lower-movable-electrode actuators 27a, 27b, 27c, 27d and upper-movable-electrode actuators 29a, 29b, 29c 29d face the opening 40 of the substrate 21. The lower-movable-electrode actuator 27 (the reference number 27 will be used when giving an explanation for one lower-movable-electrode actuator as a representative) and upper-movable-electrode actuator 29 (the reference number 29 will be used when giving an explanation for one upper-movable-electrode actuator as a representative) are unimorph-type piezoelectric actuators that are constructed by layering in order from the bottom an insulating layer 23, lower actuator electrode 31, piezoelectric layer 34, and upper actuator electrode 33. The lower actuator electrode 31 is made of platinum/titanium (Pt/Ti), the upper actuator electrode 33 is made of platinum (Pt), and both the lower actuator electrode 31 and upper actuator electrode 33 are separate from the lower movable electrode 35 and upper movable electrode 37. A signal that is inputted to the signal pad-45 from the high-frequency-signal source (not shown in the figure) passes through the line section 35a of the lower movable electrode 35 and flows from the capacitor section 35b through the air layer to the capacitor section 37b of the upper movable electrode 37 that faces the capacitor section 35b, and then passes through the line section 37a to the ground electrode 44. By reversing the direction of polarization of the piezoelectric layers 34 of both the lower-movable-electrode actuator 27 and upper-movable-electrode actuator 29, the direction of movement of the actuator drive is reversed.

By applying voltage to the upper actuator electrode 33 of the lower-movable-electrode actuator 27 by applying voltage from the power source for driving the lower movable electrode (not shown in the figure) to a lower-movable-electrode-drive pad 49, the lower movable electrode 35 moves toward the side of the upper movable electrode 37, and by applying voltage to the upper actuator electrode 33 of the upper-movable-electrode actuator 29 by applying voltage from the power source for driving the upper movable electrode (not shown in the figure) to an upper-movable-electrode-drive pad 43, the upper movable electrode 37 moves toward the side of the lower movable electrode 35, so that each movable electrode moves independently. Therefore, by driving the lower-movable-electrode actuator 27 and/or upper-movable-electrode 29 it is possible to change the distance between the upper movable electrode 37 (capacitor section 37b) and lower movable electrode 35 (capacitor section 35b) and obtain a desired electrostatic capacity.

With this invention, the line sections and capacitor sections, through which signals from the high-frequency-signal source flow, are electrically separated from the drive electrodes for driving the actuators. Therefore, the line sections and capacitor sections do not come in contact with the piezoelectric layers (high-dielectric bodies) in the actuators, and since they are surrounded by air, there is no dielectric loss, therefore it is possible to make the Q value high. FIG. 5 shows a cross-sectional view of sections B-B and C-C shown in FIG. 3. The line section 35a of the lower movable electrode 35 and the line section 37a of the upper movable electrode 37 are such that they are located between the lower actuator electrodes 31 that are connected to the ground electrodes 44. In other words, these line sections 35a and 37a become CPW type lines, and insertion loss is eliminated by adjusting the space w1 between the lower actuator electrode 31 and line section 35a or 37a and the width w2 of the line section 35a or 37a, and by making the impedance of the line section 35a or 37a 50 Ω.

Next, the method for manufacturing the variable capacitor having the above-described constitution will be explained with reference to FIG. 6 and FIG. 7. FIG. 6 and FIG. 7 show a cross-sectional view of the section A-A shown in FIG. 3.

A low-stress silicon nitride layer 23a is formed on a silicon substrate 21 using a LPCVD (Low Pressure Chemical Vapor Deposition) method, after which a Pt/Ti (having a thickness of 0.5 μm/50 nm, for example) layer 31a and a piezoelectric layer 34a (having a thickness of 0.5 μm, for example) made from lithium niobate, barium titanate, lead titanate, lead zirconate titanate, bismuth titanate, or the like are formed in order (see FIG. 6(a)).

Also, using photolithographic pattern processing, a piezoelectric layer 34 and lower actuator electrode 31 having a specified shape are formed from the piezoelectric layer 34a and Pt/Ti layer 31a (see FIG. 6(b), (c)). When performing this patterning process, a RIE (Reactive Ion Etching) apparatus that uses a Cl$_2$/Ar (chlorine/argon) gas, or an ion milling apparatus is used.

Using a photolithographic technique, a Pt upper actuator electrode 33 is formed on top of the piezoelectric layer 34 (see FIG. 6(d)), and an insulating layer 23 is obtained by patterning the silicon nitride layer 23a (see FIG. 6(e)). Instead of using a silicon nitride layer as the insulating layer 23, it is also possible to use a silicon oxide layer that is formed using a sputtering method, thermal oxidation method, CVD method or the like.

Next, after forming an Al lower movable electrode 35 having a specified shape on the substrate 21 (see FIG. 7(f)), a sacrificial layer 41 made from a resist material and having a specified shape is formed (see FIG. 7(g)), and an Al upper movable electrode 37 having a specified shape is formed at a location so that it faces the lower movable electrode 35 (see FIG. 7(h)).

Also, the substrate 21 around the lower movable electrode 35, upper movable electrode 37, lower-movable-electrode actuator 27 and upper-movable-electrode actuator 29 is etched from the underneath surface using a DRIE (Deep Reactive Ion Etching) apparatus to form an opening 40 (see FIG. 7(i)). From this etching, the remaining sections, except for the end sections of the line sections 35a and 37a of the lower movable electrode 35 and upper movable electrode 37 and each of the end sections of the lower-movable-electrode actuator 27 and upper-movable-electrode actuator 29, are removed from the substrate 21. The etching gas used in this process is SF$_6$ (sulfur hexafluoride), and the masking used for forming the opening 40 is a resist material.

Finally, the sacrificial layer 41 is etched and removed, and the variable capacitor is manufactured by maintaining a space 42 between the lower movable electrode 35 and upper movable electrode 37 (see FIG. 7(j)).

Differing from the manufacturing sequence described above, after performing the process shown in FIG. 7(h), it is possible to first remove the sacrificial layer 41 and maintain the space 42 between the lower movable electrode 35 and upper movable electrode 37 before etching the substrate 21 and forming the opening 40. Also, instead of resist described above as the material used for the sacrificial layer 41, it is possible to use an oxide such as MgO (magnesium oxide), and in that case, it is possible to use acetic acid or nitric acid as the etchant.

FIG. 8 shows a modification of the manufacturing method for a variable capacitor. The manufacturing processes in the first half of this modification are the same as those described above (see FIG. 6(a) to FIG. 7(f)). The sacrificial layer 41 having a specified shape is formed from the same silicon material as the substrate 21 (see FIG. 8(a)), and the Al upper movable electrode 37 having a specified shape is formed at a location so that it faces the lower movable electrode 35 (see FIG. 8(b)).

Also, SF$_6$ gas, for example, is used to simultaneously etch the sacrificial layer 41 and substrate 21 from the top surface side of the substrate 21 to form a cavity 47 (see FIG. 8(c)). From this etching, removing the remaining sections, except the end sections of the line sections 35a and 37a of the lower movable electrode 35 and upper movable electrode 37 and each of the end sections of the lower-movable-electrode actuator 27 and upper-movable-electrode actuator 29, from the substrate 21 is the same as in the example described above, however, etching is performed from the top surface side of the substrate 21, so the cavity 47 is formed instead of the opening as described in the example above.

An exploded pictorial view of the variable capacitor manufactured according to this modification is shown in FIG. 9. A cross-shaped cavity 47 is formed in the central section of the substrate 21. In FIG. 9, the same reference numbers are given to sections that are identical to those shown in FIG. 3 and FIG. 4, and an explanation of those sections is omitted.

Second Embodiment

FIG. 10 is an exploded pictorial view of the variable capacitor of a second embodiment of the invention, and FIG. 11 and FIG. 12 are cross-sectional drawings showing the manufacturing process for this variable capacitor.

In this second embodiment, there is a space 50 around the lower movable electrode 35, upper movable electrode 37, lower-movable-electrode actuator 27 and upper-movable-electrode actuator 29 between the lower movable electrode 35, upper movable electrode 37 and insulating layer 23 and the substrate 21. Also, instead of being made of silicon, the substrate 21 is formed from a material such as glass, sapphire, alumina, glass ceramic, gallium arsenic, or the like. The remaining construction is the same as that of the first embodiment, and the same reference numbers are given to identical sections.

After forming a second sacrificial layer 51 made from silicon using a sputtering method on top of the substrate 21 that is made from a material such as glass, for example, a silicon nitrate layer 23a, Pt/Ti layer 31a, and piezoelectric layer 34a are formed in order in the same way as in the first embodiment (see FIG. 11(a)). Also, as in the first embodiment, a piezoelectric layer 34, lower actuator electrode 31, upper actuator electrode 33 and insulating layer 23 each of which has a specified shape are obtained (see FIG. 11(b) to (e)).

Next, after an Al lower movable electrode 35 having a specified shape is formed on the second sacrificial layer 51 (see FIG. 12(f)), a sacrificial layer 41 made from a resist material is formed over the entire body (see FIG. 12(g)), and an Al upper movable electrode 37 having a specified shape is formed at a location so that it faces the lower movable electrode 35 (see FIG. 12(h)).

Also, the sacrificial layer 41 is etched and removed, maintaining a space 42 between the lower movable electrode 35 and the upper movable electrode 37 (see FIG. 12(i)), and by etching and removing the second sacrificial layer 51 and maintaining a space 50 between the substrate 21 and the lower movable electrode 35 and insulating layer 23, the variable capacitor is manufactured (see FIG. 12(j)). It is possible to make the sacrificial layer 41 and the second sacrificial layer 51 from the same material and to etch the sacrificial layer 41 and second sacrificial layer 51 at the same time.

In this second embodiment, by etching the second sacrificial layer 51, it is possible to make the lower movable electrode 35 float in air from the substrate 21, so it is not necessary to etch the substrate 21, and it is possible to increase the types of materials that can be used as the substrate 21. For example, it becomes possible to use material that is difficult to etch such as glass ceramic having a low dielectric constant. This makes it possible to further increase the Q value.

Third Embodiment

FIG. 13 is an exploded pictorial view of the variable capacitor of a third embodiment of the invention (only the movable electrode and actuator), and FIG. 14 and FIG. 15 are cross-sectional drawings showing the manufacturing process for this variable capacitor.

In this third embodiment, a dielectric layer 46 is located between the lower movable electrode 35 (capacitor section 35b) and the upper movable electrode 37 (capacitor section 37b). The other construction is the same as that of the first embodiment, and the same reference numbers are given to identical sections and an explanation is omitted.

This dielectric layer 46 can be located on the side of the upper movable electrode 37 (capacitor section 37b) as shown in FIG. 13, or on the side of the lower movable electrode 35 (capacitor section 35b) (not shown in the figure). The mass of the movable section is increased by using this dielectric layer 46, so the resonant frequency is slightly lowered or the movement speed is lowered a little, however, it is possible to greatly increase the electrostatic capacity and rate of change of that capacity as described below.

FIG. 16 is a drawing showing the effect of the dielectric layer 46. As shown in FIG. 16(a), the case in which the dielectric layer 46 is located on the side of the capacitor section 37b of the upper movable electrode 37 is explained. By taking the thickness of the dielectric layer 46 to be d1, and the thickness of the air layer that is formed between the dielectric layer 46 and the capacitor section 35b of the lower movable electrode 35 to be d2, the distance d between the capacitor section 37b and capacitor section 35b becomes d=d1+d2.

FIG. 16(b) is a graph showing the change in electrostatic capacity C when the capacitor section 35b and/or the capacitor section 37b are moved and the thickness d2 of the air layer is changed. The capacitor 35b and capacitor 37b were square (230 μm on a side), and the distance d between electrodes and the thickness d2 of the air layer in the initial state were d=0.75 μm and d2=0.3 μm (d2/d=0.4), and a dielectric layer 46 (dielectric constantε=10) made from $Al_2O_3$ (alumina) having low dielectric loss was used. Also, the change in electrostatic capacity C of a comparative example, which was different only in that there was no dielectric layer, is shown in addition in FIG. 16(b).

As shown in FIG. 16(b), in the case of the variable capacitor of this invention having a dielectric layer 46, the electrostatic capacity C in the initial state was about 1.36 pF, and electrostatic capacity in the state in which the capacitor section 35b is in contact with the dielectric layer 46 is about 10.4 pF, so the change is about 7.6 times. By using a dielectric layer 46 in this way, the electrostatic capacity and the variable range can be made very large.

FIG. 14 is a cross-sectional drawing showing an example of the manufacturing process for the variable capacitor of this third embodiment (a dielectric layer 46 is located on the side of the upper movable electrode 37 (capacitor section 37b)). The first half of the process is the same as the process of the first embodiment described above (see FIG. 6(a) to FIG. 7(g)).

Using photolithographic patterning, a dielectric layer 46 made from $Al_2O_3$ is formed on a sacrificial layer 41 (see FIG. 14(a)), and an Al upper movable electrode 37 having a specified shape is formed at a location so that it faces the lower movable electrode 35 (see FIG. 14(b)). Also, a DRIE apparatus is used to etch the substrate 21 around the lower movable electrode 35, upper movable electrode 37, lower-movable-electrode actuator 27 and upper-movable-electrode actuator 29 from the underneath surface to form an opening 40 (see FIG. 14(c)). Finally, the variable capacitor is manufactured by etching and removing the sacrificial layer 41 and maintaining a space 42 between the lower movable electrode 35 and the dielectric layer 46 (see FIG. 14(d)).

FIG. 15 is a cross-sectional drawing showing an example of the manufacturing process of the variable capacitor of this third embodiment (dielectric layer is located on the side of the lower movable electrode 35 (capacitor section 35b)). The first half of the process is the same as the processing of the first embodiment (see FIG. 6(a) to FIG. 7(f)).

Using photolithographic patterning, a dielectric layer 46 made from $Al_2O_3$ is formed on top of the lower movable electrode 35 (see FIG. 15(a)). A sacrificial layer 41 made from a resist material or MgO is then formed into a specified shape (See FIG. 15(b)), and an Al upper movable electrode 37 having a specified shape is formed at a location so that it faces the lower movable electrode 35 (see FIG. 15(c)). Also, the substrate 21 around the lower movable electrode 35, upper movable electrode 37, lower-movable-electrode actuator 27 and upper-movable-electrode actuator 29 is etched from the underneath surface using a DRIE apparatus to form an opening 40 (see FIG. 15(d)). Finally, the sacrificial layer 41 is etched and removed, and by maintaining a space 42 between the dielectric layer 46 and the upper movable electrode 37, the variable capacitor is manufactured (see FIG. 15(e)).

Differing from the manufacturing sequence of FIG. 14 and FIG. 15 described above, after the processing shown in FIG. 14(b) and FIG. 15(c), first, it is possible to etch the substrate 21 and form the opening 40 after removing the sacrificial layer 41 and maintaining the space 42. Also, in this third embodiment, as described above (see FIG. 8), it is possible to make the sacrificial layer 41 from the same material as the substrate 21, and to etch the sacrificial layer 41 and substrate 21 in order or simultaneously from the top surface of the substrate 21.

Fourth Embodiment

FIG. 17 shows a fourth embodiment of the invention, where FIG. 17(a) is a top view of the variable capacitor of this fourth embodiment, and FIG. 17(b) is an enlarged view of section D shown in FIG. 17(a).

In this fourth embodiment, in the lower movable electrode 35, one of the line sections 35a is connected to the signal pad 45, and the capacitor section 35b and the other line section 35a are electrically separated. In other words, as seen from the signal pad 45, after the section where the lower movable electrode 35 faces the upper movable electrode 37 to form the capacitor (section where the capacitor section 35b faces the capacitor section 37b), the lower movable electrode 35 is electrically separated into two. Also, the separated line section 35a can be connected to the ground electrode 44 and be at ground potential.

In this fourth embodiment, a signal which enters from the signal pad 45 flows through one of the line sections 35a and passes by the capacitor section 35b doesn't reach the end on the opposite side from the signal pad 45 of the other line section 35a, and aren't reflected there, it is possible to remove this kind of reflected signal and thus it is possible to prevent energy loss of the input signal.

Fifth Embodiment

FIG. 18 is a top view of the variable capacitor of a fifth embodiment. In FIG. 18, a power-supply circuit 48 is located between the signal pad 45 and ground electrode 44, which makes it possible to apply voltage between the signal pad 45 (lower movable electrode 35) and the ground electrode 44 (upper movable electrode 37).

This fifth embodiment relates to a method for adjusting the space between the lower movable electrode 35 (capacitor section 35b) and the upper movable electrode 37 (capacitor section 37b). After driving the lower-movable-electrode actuator 27 and/or upper-movable-electrode actuator 29 and decreasing the space between the capacitor section 35b and the capacitor section 37b, the power-supply circuit 48 applies voltage between the lower movable electrode 35 and the upper movable electrode 37, and the electrostatic attraction that occurs between the electrodes further decreases the distance between the electrodes.

In this way, with this fifth embodiment, two-stage distance control is performed by the piezoelectric-actuator drive and electrostatic-actuator drive, making it possible to bring the movable electrodes even closer together, and thus making it possible to obtain even larger change in electrostatic capacity. After the movable electrodes have been brought close together by the piezoelectric actuator, electrostatic attraction occurs, which has the effect of making it possible to obtain large electrostatic capacity and change in capacity. Moreover, after the movable electrodes have been brought close together by the piezoelectric actuator, electrostatic attraction occurs, so it is possible to generate large electrostatic attraction with a small drive voltage.

In the embodiments described above, the lower-movable-electrode actuator 27 and upper-movable-electrode actuator 29 are unimorph-type actuators, however, the invention is not limited to this. For example, the actuators could be parallel-contact-type bimorph actuators as shown in FIG. 19(a), or could be serial-contact-type bimorph actuators as shown in FIG. 19(b). In FIG. 19(a), (b), piezoelectric elements 54a, 54b, which are polarized in the direction indicated by the arrows in the figure, are located above and below a middle electrode 63. A lower drive electrode 53 is located on the piezoelectric element 54a, and an upper drive electrode 55 is located on the piezoelectric element 54b. Also, as shown in the figure, by applying a direct-current voltage V, the bimorph deforms. When the lower-movable-electrode actuator 27 and upper-movable-electrode actuator 29 are bimorph type, then in the embodiments described above there is no need for the insulating layer 23 that is in contact with the lower actuator electrode 31.

The present invention is not limited by the embodiments and modifications described above, and may include other various embodiments or modifications. For example, in the embodiments described above, piezoelectric actuators are driven to decrease the distance between both of the movable electrodes, or decrease the distance between a movable electrode and dielectric layer (increase the electrostatic capacity), however, conversely it is also possible to drive the actuators to increase these distances (reduce the electrostatic capacity). In that case, the direction of deformation of the unimorph-type piezoelectric actuators is made to be the opposite direction.

Also, the variable capacitor in the embodiments or modifications described above can be stored in a ceramic package. In that case, the external connection terminals formed in the package, and various pads such as the signal pad 45 formed on the substrate 21 are connected by a connection member such as wire or bumps.

BRIEF DESCRIPTION OF THE DRAWINGS

FIG. 1 is a cross-sectional view and top view showing the construction of a conventional variable capacitor;

FIG. 5 is a cross-sectional drawing of section B-B and section C-C shown in FIG. 3;

FIG. 16 is a drawing for explaining the effect of a dielectric layer in the variable capacitor of the third embodiment;

FIG. 17 is a top view and enlarged view of the variable capacitor of a fourth embodiment;

Explanation of the Reference Numerals

Figure 2:
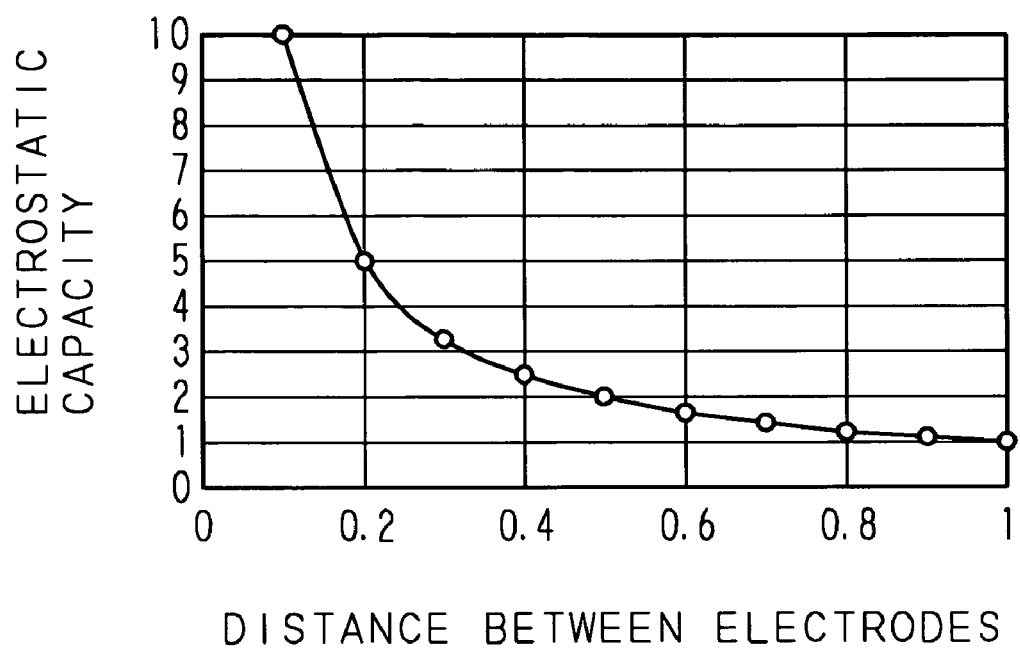
FIG. 2 is a graph showing the relationship between the electrostatic capacity and distance between electrodes of a capacitor.
Figure 3:
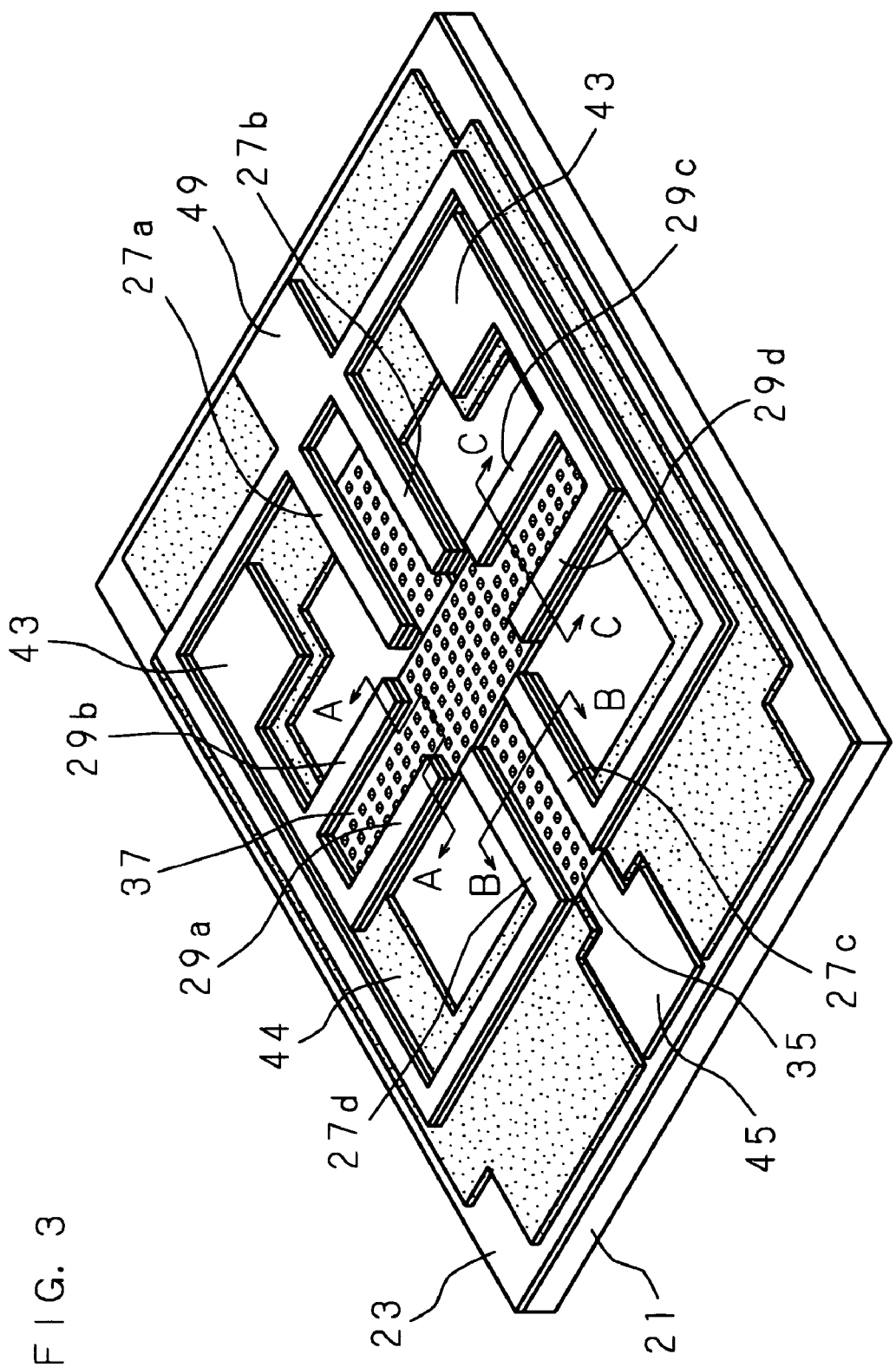
FIG. 3 is a pictorial drawing of the variable capacitor of a first embodiment.
Figure 4:
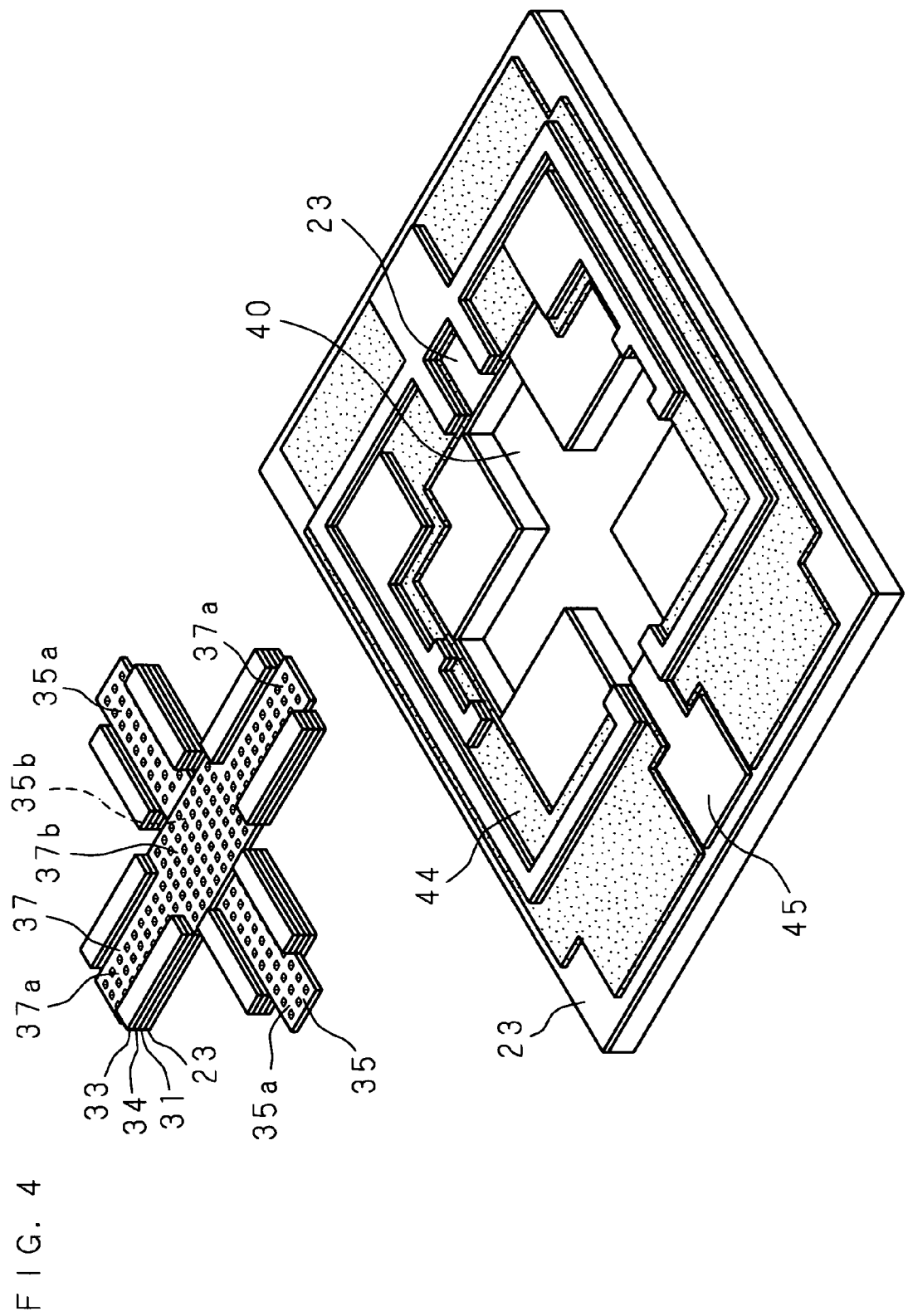
FIG. 4 is an exploded pictorial drawing of the variable capacitor of the first embodiment.
Figure 6:
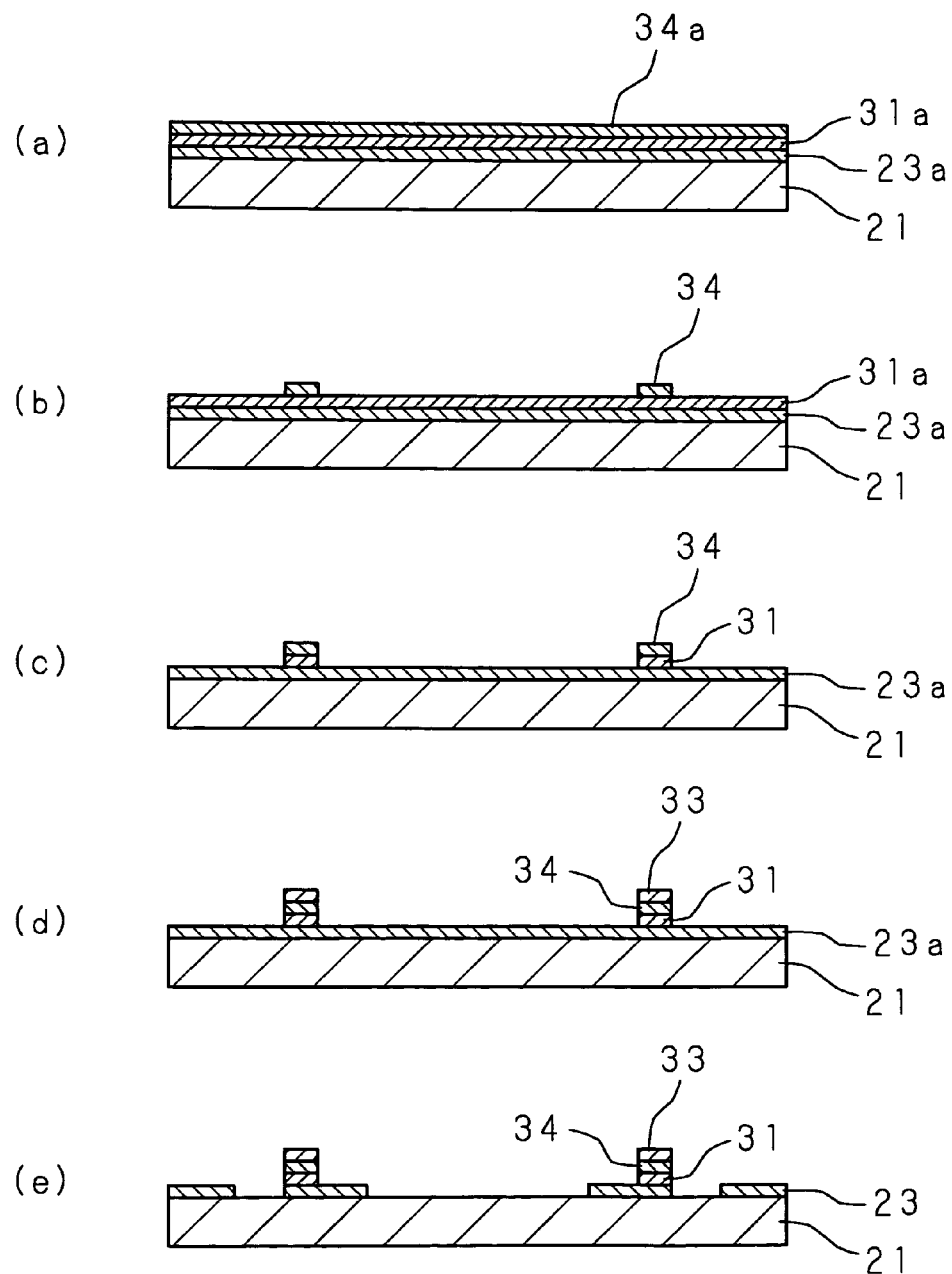
FIG. 6 is a cross-sectional drawing showing the manufacturing process of the variable capacitor of the first embodiment.
Figure 7:
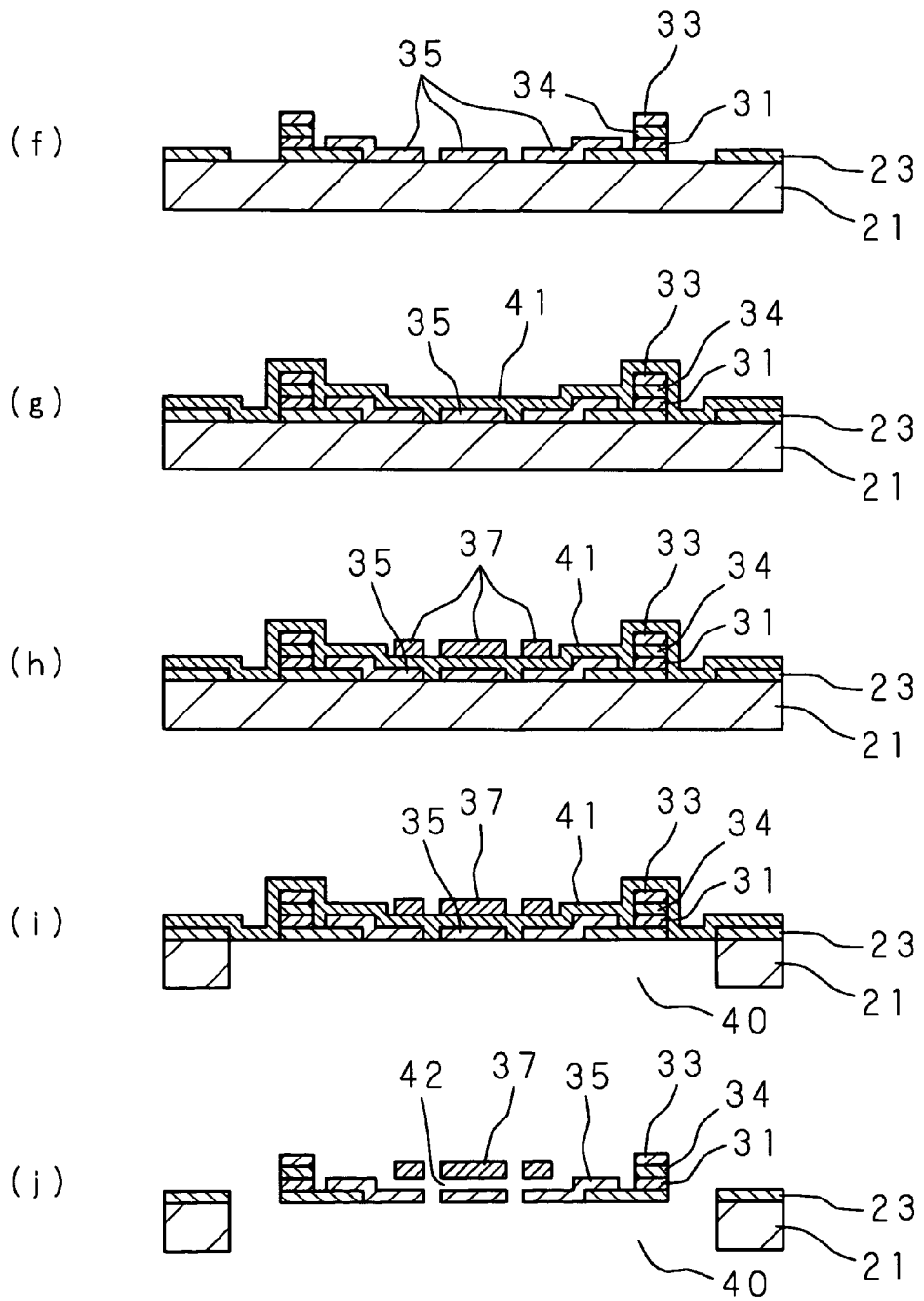
FIG. 7 is a cross-sectional drawing showing the manufacturing process of the variable capacitor of the first embodiment.
Figure 8:
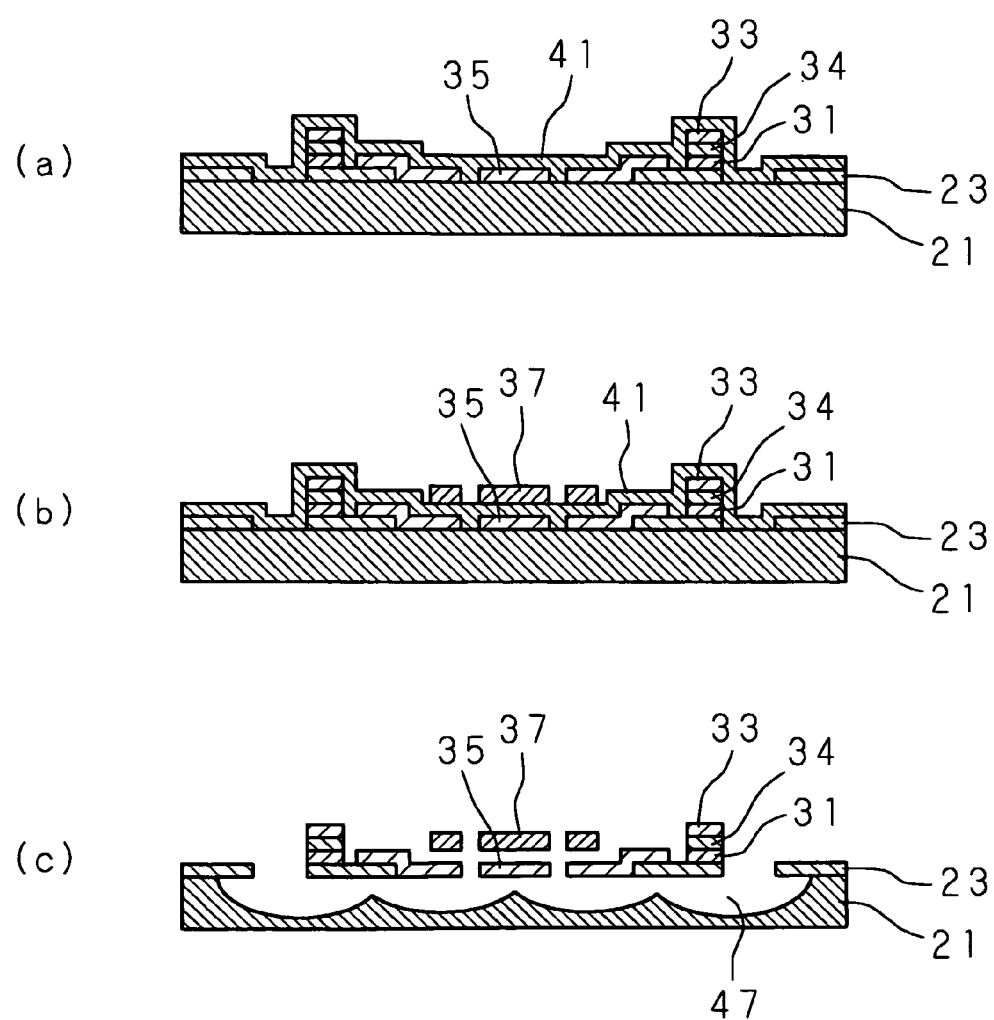
FIG. 8 is a cross-sectional drawing showing a modification of the manufacturing process of the variable capacitor of the first embodiment.
Figure 9:
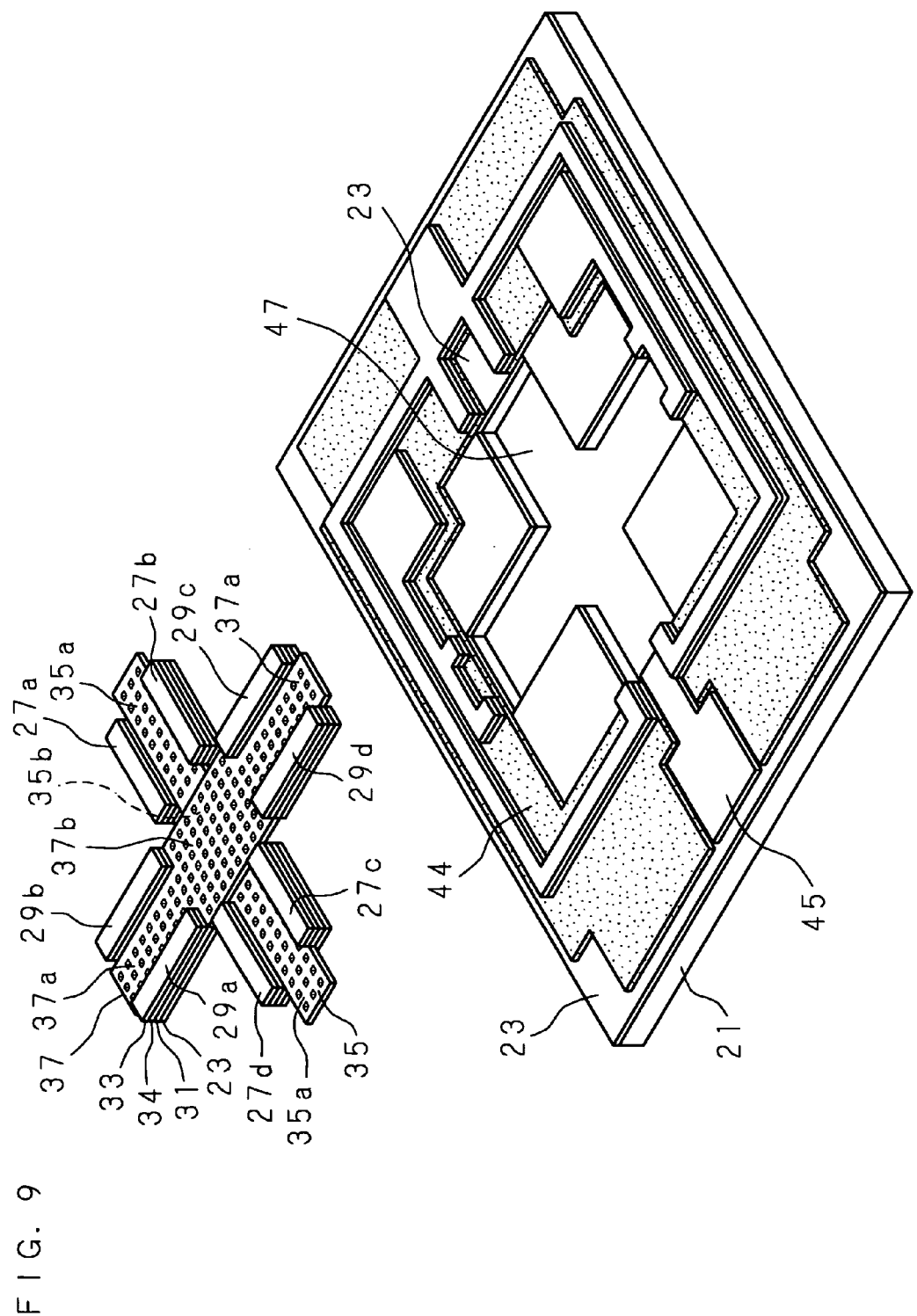
FIG. 9 is an exploded pictorial drawing of a modification of the variable capacitor of the first embodiment.
Figure 10:
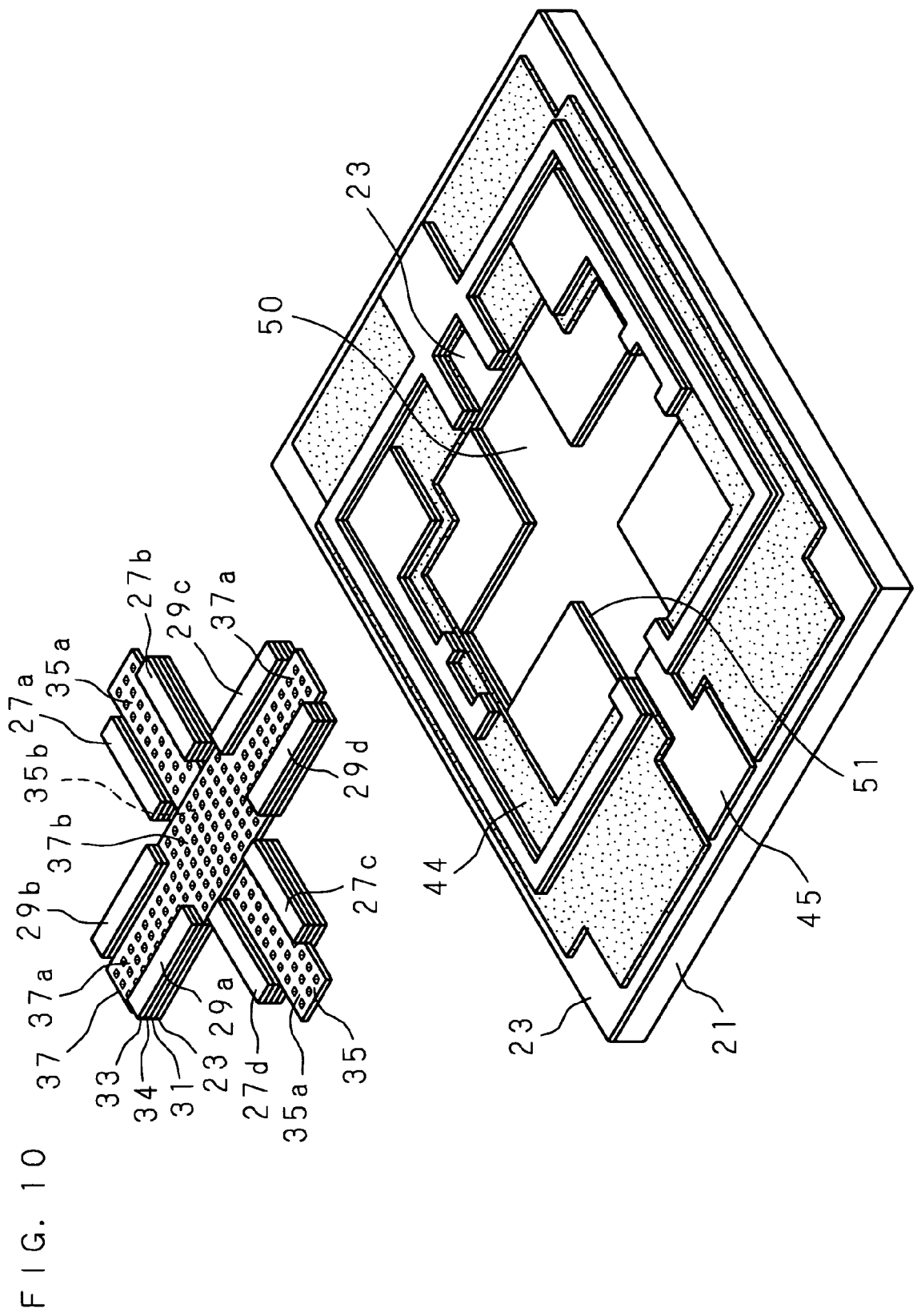
FIG. 10 is an exploded pictorial drawing of the variable capacitor of a second embodiment.
Figure 11:
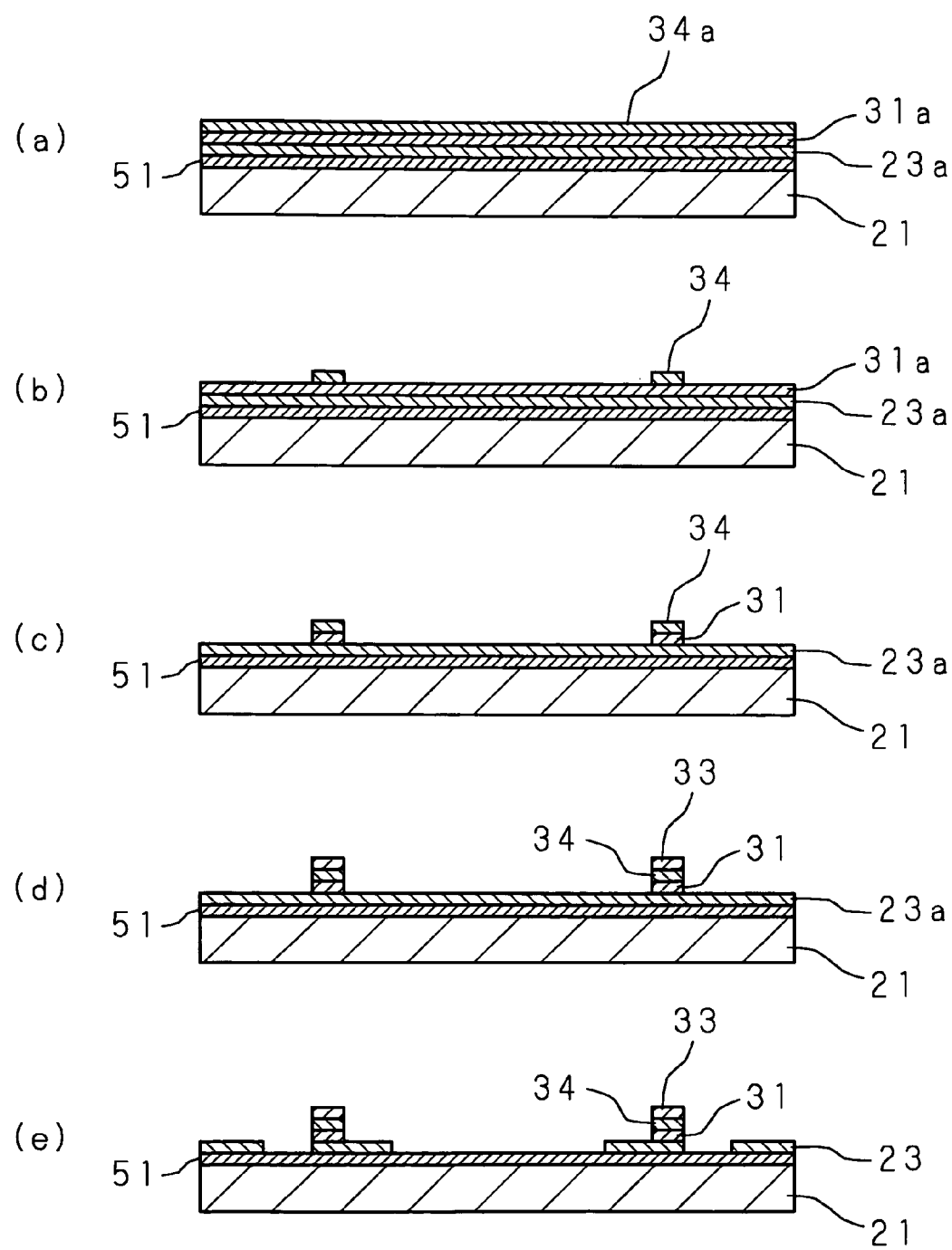
FIG. 11 is a cross-sectional drawing showing the manufacturing process of the variable capacitor of the second embodiment.
Figure 12:
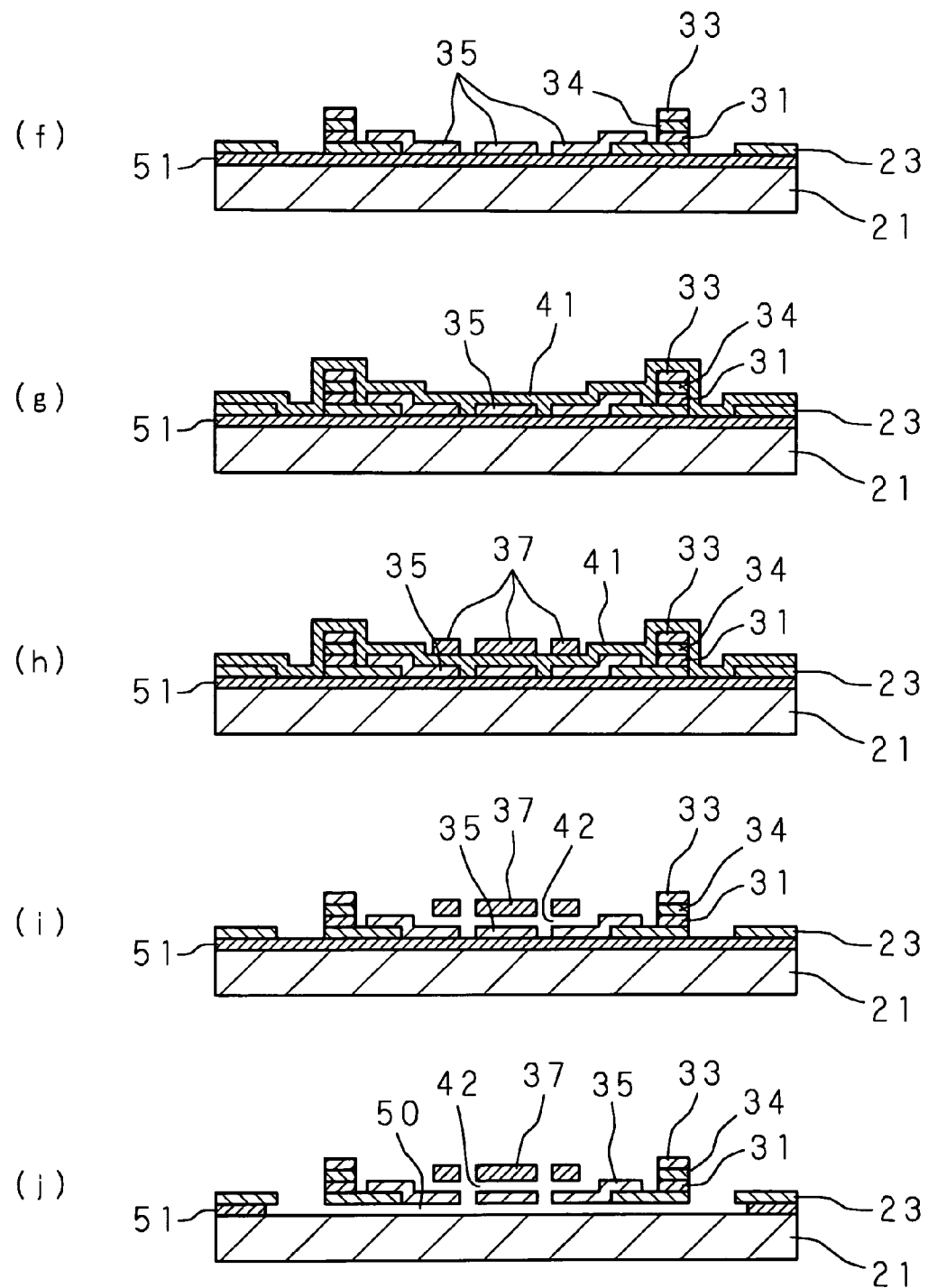
FIG. 12 is a cross-sectional drawing showing the manufacturing process of the variable capacitor of the second embodiment.
Figure 13:
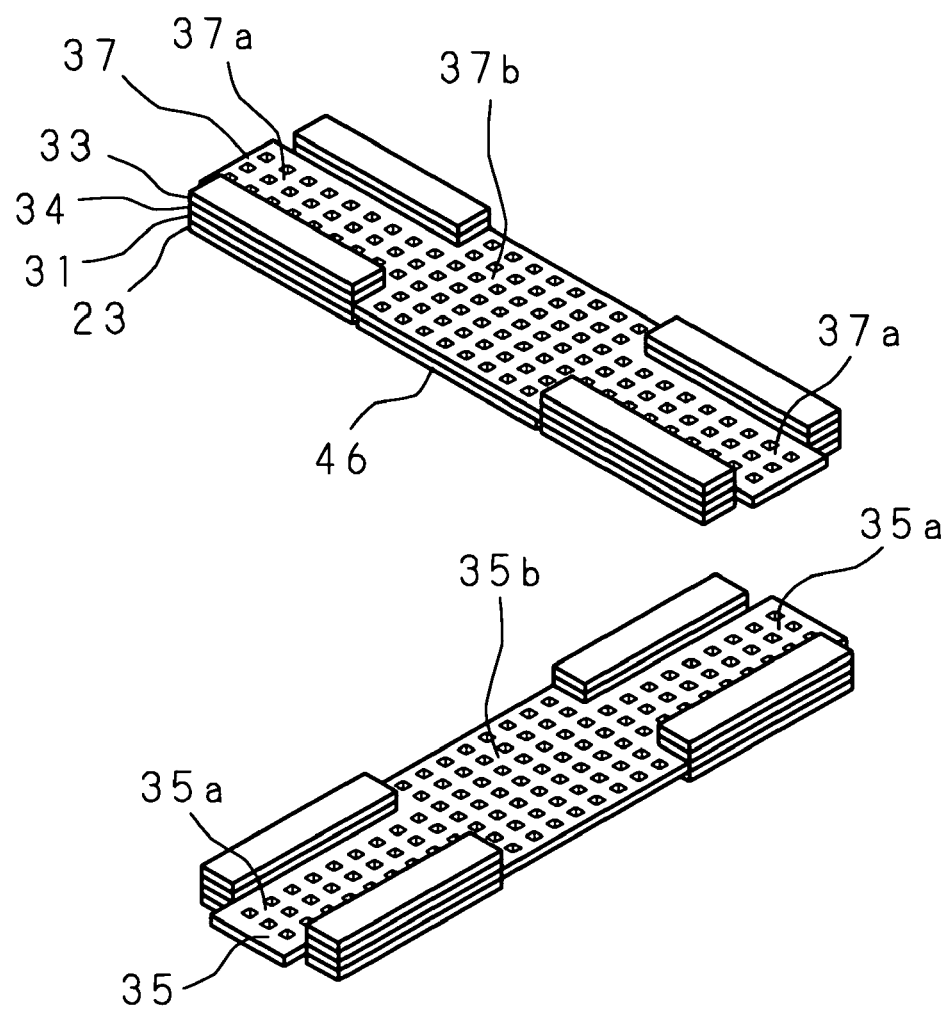
FIG. 13 is an exploded pictorial drawing of the variable capacitor of a third embodiment (movable electrodes and piezoelectric actuators only)
Figure 14:
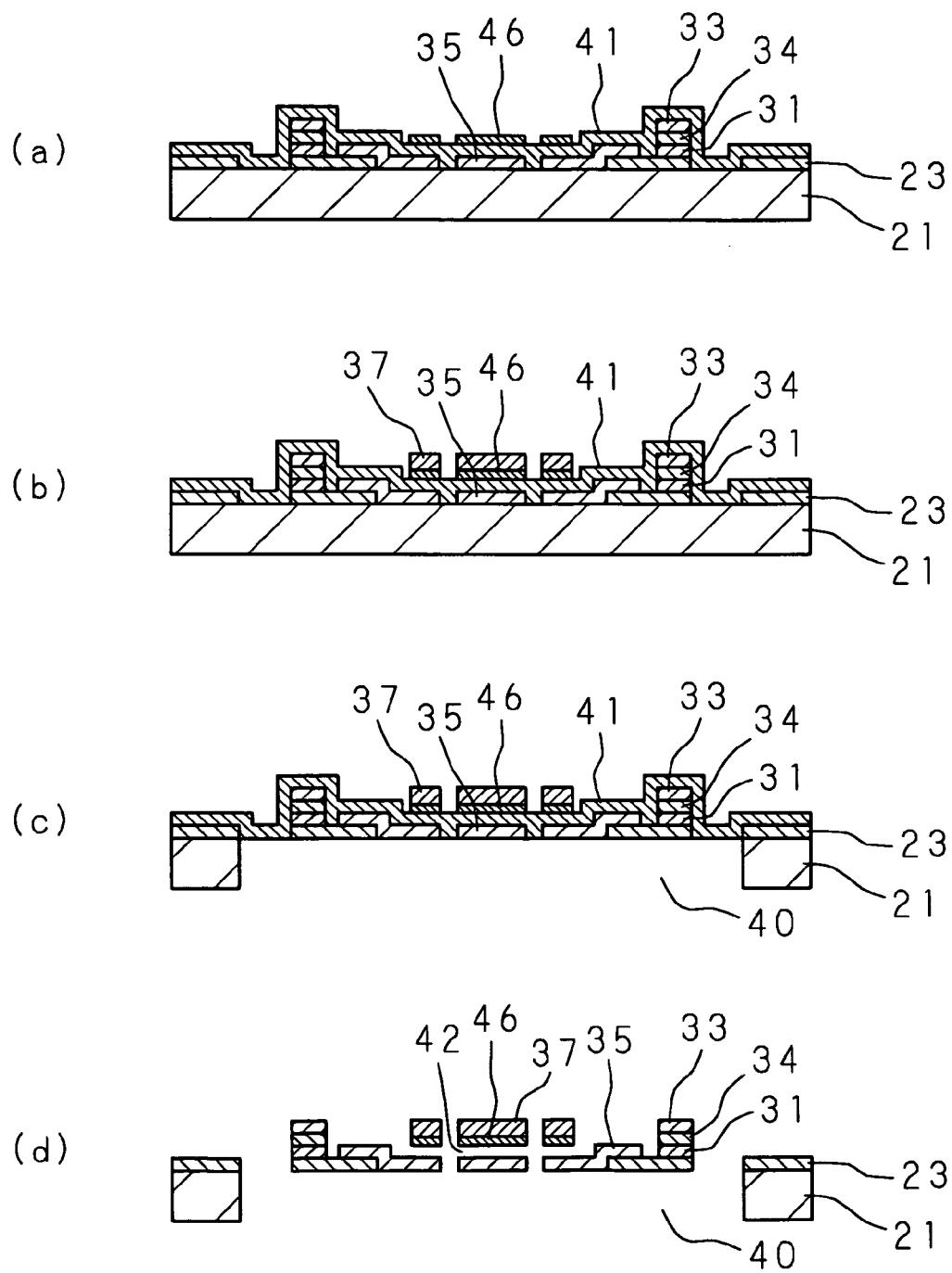
FIG. 14 is a cross-sectional drawing showing an example of the manufacturing process of the variable capacitor of the third embodiment.
Figure 15:
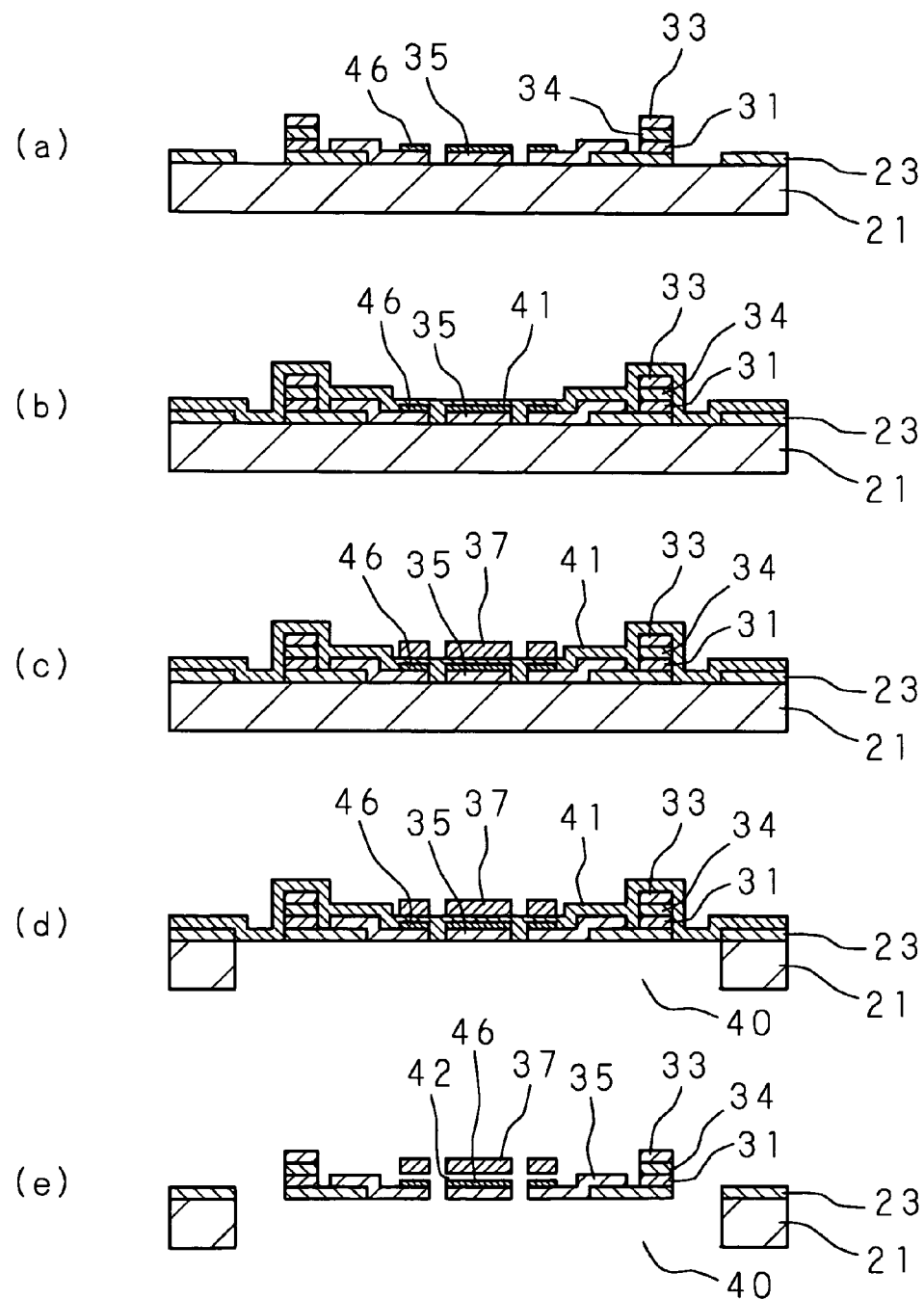
FIG. 15 is a cross-sectional drawing showing another example of the manufacturing process of the variable capacitor of the third embodiment.
Figure 18:
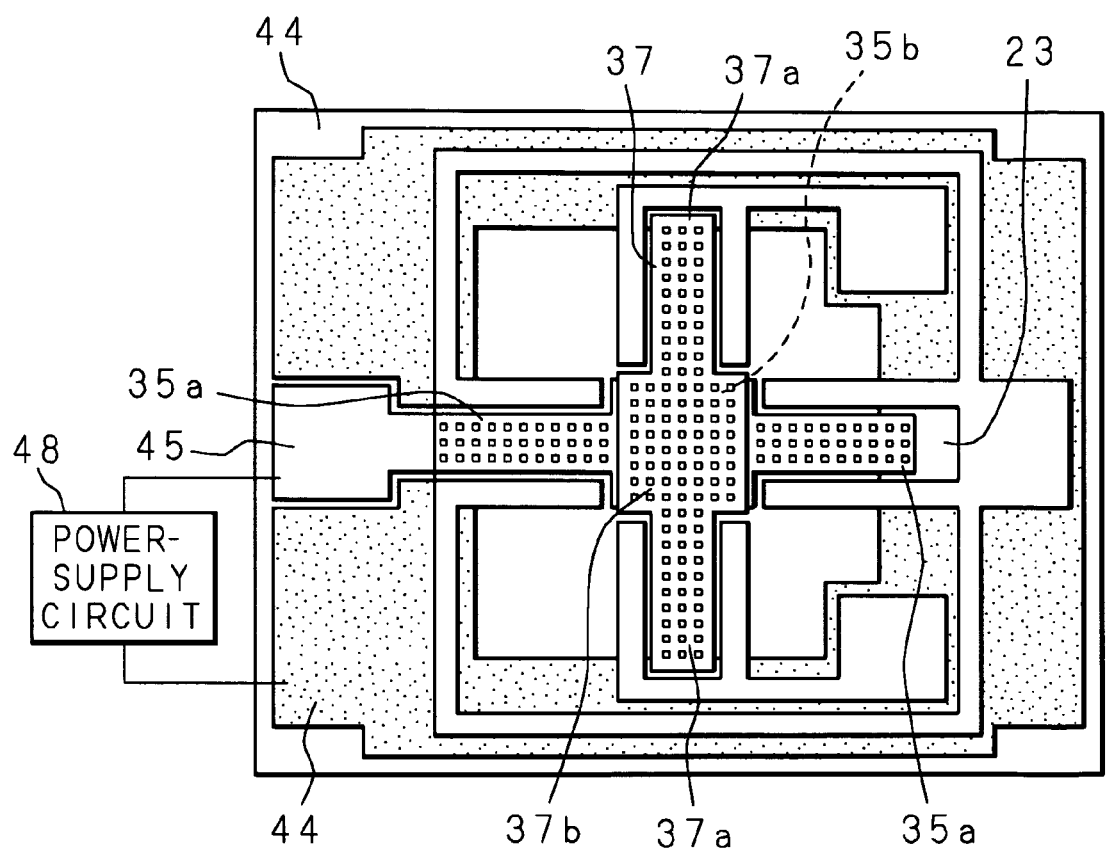
FIG. 18 is a top view of the variable capacitor of a fifth embodiment.
Figure 19:
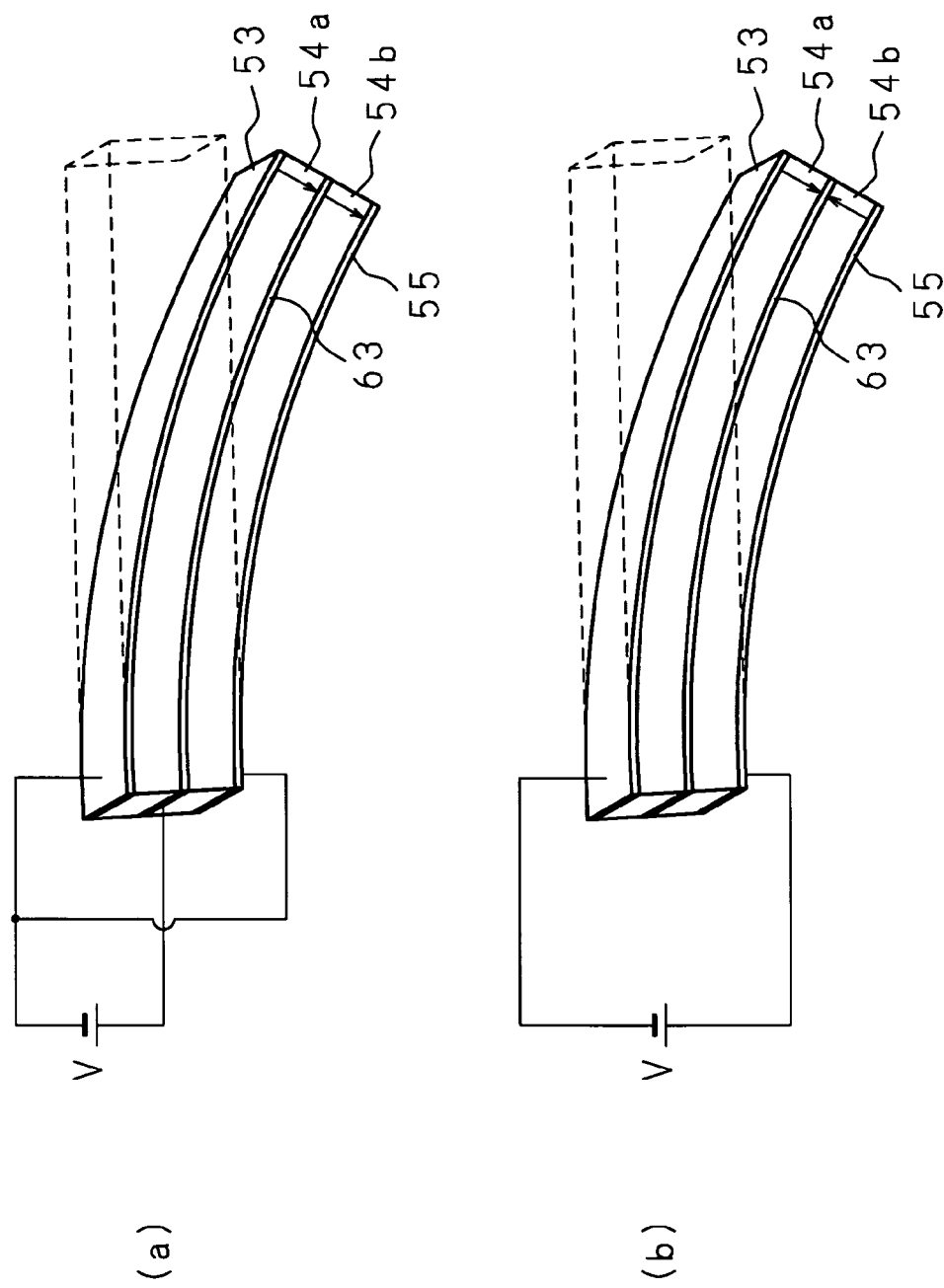
FIG. 19 is a drawing for explaining a bimorph-type piezoelectric actuator.

21 Substrate
23 Insulating layer
27, 27a, 27b, 27c, 27d Lower-movable-electrode actuator
29, 29a, 29b, 29c, 29d Upper-movable-electrode actuator
31 Lower actuator electrode
33 Upper actuator electrode
34 Piezoelectric layer
35 Lower movable electrode
37 Upper movable electrode 35a, 37a Line section (first electrode section)
35b, 37b Capacitor section (second electrode section)
40 Opening
41 Sacrificial layer
44 Ground electrode
45 Signal pad
46 Dielectric layer
47 Cavity
48 Power-supply circuit
Space
Second sacrificial layer

The invention claimed is:

1. A variable capacitor having movable electrodes that face each other and comprising:
   a substrate;
   movable electrodes having first electrode sections and second electrode sections; and
   a plurality of piezoelectric actuators that drive said movable electrodes; wherein said movable electrodes face each other to form a capacitor, and said movable electrode is conductively connected to a signal pad.

2. The variable capacitor of claim 1 wherein
   said movable electrodes have said first electrode sections and second electrode sections, and said movable electrodes are placed so that one is an upper movable electrode and the other is a lower movable electrode.

3. The variable capacitor of claim 1 wherein
   each of said plurality of piezoelectric actuators includes drive electrodes and a piezoelectric element that is located between said drive electrodes, and said drive electrodes are separate from said movable electrodes.

4. The variable capacitor of claim 3 wherein
   said piezoelectric actuators are located on both sides of first electrode sections of said movable electrodes, and lines of a coplanar waveguide are formed by said first electrode sections and drive electrodes of said piezoelectric actuators.

5. The variable capacitor of claim 1 wherein
   a dielectric layer is located between said second electrode sections of said movable electrodes that face each other.

6. The variable capacitor of claim 1 wherein at least one of said movable electrodes is connected to a ground electrode.

7. The variable capacitor of claim 1 wherein said first electrode section and said second electrode section of at least one of said movable electrodes are electrically separated.

8. A variable capacitor comprising:
   movable electrodes that can be moved in the direction toward each other;
   a plurality of piezoelectric actuators that drive said movable electrodes; and
   a voltage application unit for applying voltage between said movable electrodes; wherein
   when said movable electrodes have been driven close to each other by said piezoelectric actuators, said voltage application unit applies voltage between said movable electrodes.

9. A method for manufacturing a variable capacitor having movable electrodes that are driven by piezoelectric actuators, comprising:
   a process of forming a plurality of said piezoelectric actuators on a substrate;
   a process o forming movable elecrodes having first electrode sections and second electrode sections on said substrate;
   a process of forming a sacrificial layer for forming a space between said movable electrodes;
   a removal process of removing said sacrificial layer; and
   a separation process of cutting and separating the sections except the end sections of said plurality of piezoelectric actuators and end sections of the first electrode sections of said movable electrodes from said substrate.

10. The method for manufacturing a variable capacitor of claim 9 wherein
    said removal process and said separation process are preformed simultaneously.

11. A method for manufacturing a variable capacitor having movable electrodes that are driven by piezoelectric actuators, comprising:
    a process of forming a plurality of said piezoelectric actuators on a substrate;
    a process of forming movable electrodes having first electrode sections and second electrode sections on said substrate;
    a process of forming a dielectric layer between said movable electrodes;
    a process of forming a sacrificial layer for forming a space between at least one of said movable electrodes and said dielectric layer;
    a removal process of removing said sacrificial layer; and
    a separation process of cutting and separating the sections except the end sections of said plurality of piezoelectric actuators and end sections of the first electrode sections of said movable electrodes from said substrate.

12. The method for manufacturing a variable capacitor of claim 11 wherein
    said removal process and said separation process are performed simultaneously.

* * * * *